March 19, 1963
S. N. HOWELL
3,081,632
DIRECT-READING PYROMETER MICROSCOPE
Filed Feb. 12, 1957
FIG. 3.
FIG. 1.
FIG. 2.
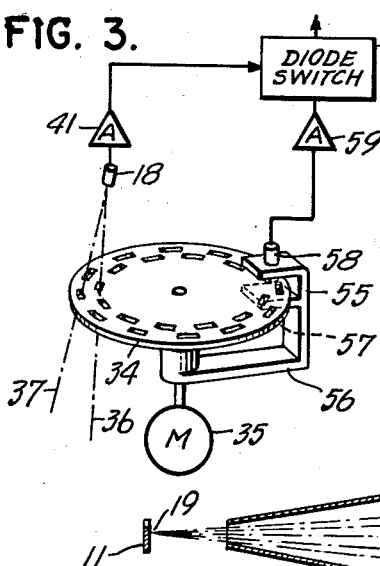
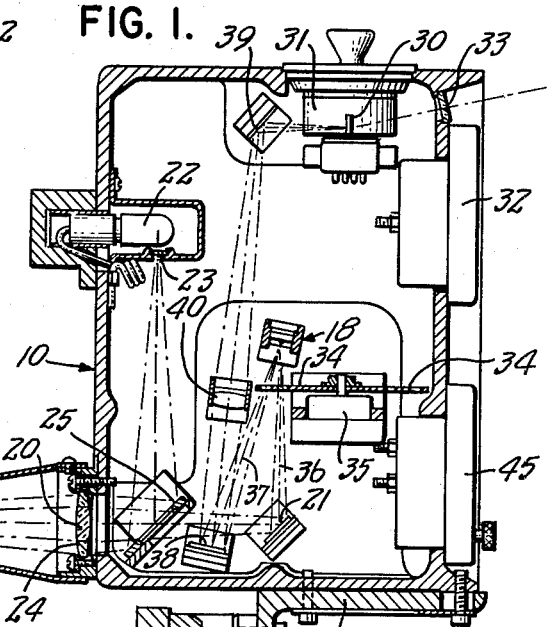
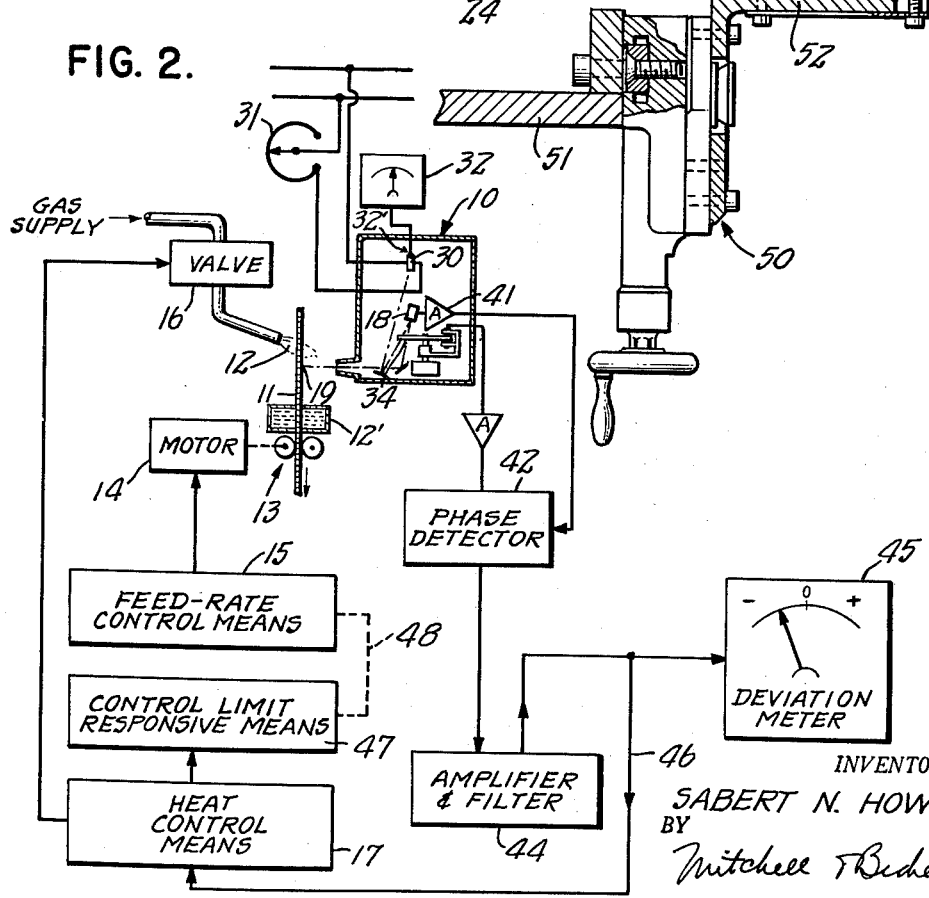
INVENTOR.
SABERT N. HOWELL
BY
Mitchell Bechert
ATTORNEYS

United States Patent Office 3,081,632
Patented Mar. 19, 1963

3,081,632
DIRECT-READING PYROMETER MICROSCOPE
Sabert N. Howell, Huntington, N.Y., assignor to Servo Corporation of America, New Hyde Park, N.Y., a corporation of New York
Filed Feb. 12, 1957, Ser. No. 639,707
9 Claims. (Cl. 73—355)

My invention relates in general to an improved radiation-pyrometer construction and more specifically to a direct-reading pyrometer microscope.

When monitoring a localized surface temperature, particularly temperatures at which the radiation is barely visible or is primarily in the infrared, it becomes more and more difficult to obtain reliable and accurate sighting on the desired monitored (or target) area, the smaller the spot size to be monitored. The uncertainty can exist as to axial alignment of the sighting optical apparatus with the target area and as to exact focal distance; in other words, for very small target areas an error in focusing the infrared optical apparatus can mean that the heat detector is responding to a larger and less sharply defined area, which means that one is not actually measuring or observing merely the radiation from the desired target area.

It is, accordingly, an object of the invention to provide an improved pyrometer of the character indicated.

Another object is to provide improved sighting (targeting) means for a pyrometer microscope, that is, for a pyrometer in which the heat-responsive area of its bolometer, when viewed by the pyrometer optical apparatus, is of relatively small or microscopic proportions.

A specific object of my invention is to provide a pyrometer microscope which inherently simplifies the task of accurate sighting by visibly indicating (a) the positioning adjustments needed to sight the microscope on a predetermined target area, and (b) the accuracy of sighting thereon, without affecting the primary heat-monitoring function of the microscope.

A further object is to provide an improved pyrometer microscope which is direct-reading in terms of target temperature.

It is also an object to provide an improved pyrometer microscope which is direct-reading in terms of degrees deviation from a preset target temperature.

Another important object of the invention is to provide a pyrometer microscope capable of furnishing an output for automatically regulating and controlling a heat-treating process.

Still another object is to provide an improved radiometer involving electrical evaluation of the heat difference between an unknown source and a reference source, and specifically permitting direct optical inspection and monitoring of the temperature of the reference source.

Other objects and various further features of novelty and invention are pointed out, or will occur to those skilled in the art from a reading of the following specification in conjunction with the accompanying drawings. In said drawings, which show, for illustrative purposes only, a preferred form of the invention:

FIG. 1 is a simplified sectional view through the housing of a pyrometer microscope of my invention, optical rays and paths being schematically indicated;

FIG. 2 is an electrical block diagram schematically showing functional parts, for an application of the device of FIG. 1 to the automatic heat treating of a continuous band-saw blade; and FIG. 3 schematically depicts in greater detail a portion of the device of FIG. 1.

Briefly stated, my invention contemplates an improved sighting means particularly applicable to a pyrometer microscope, that is, in situations in which the target area (the area viewed by the heat-sensitive cell) is of small or microscopic proportions, and in which it is otherwise difficult if not impossible to know the location of the target area in relation to the entire surface, of which the target area forms but a part. The improved sighting results from projecting a visible image or light spot onto the target area and along the same axis as that of the heat-responsive optical apparatus, the arrangement being such that the detector cell is relatively unaffected by the projected light energy, and that the projected image coincides in focus and in area to the target area viewed by the detector cell. In the form to be described, this is achieved by a concentric-lens configuration, employing visible-light and infrared-transmitting elements of equal focal length. The invention is further described in application to the automatic monitoring of temperature on a band-saw blade that is continuously moving past a localized heat-treating source.

Referring to the drawings, my invention is shown in application to a pyrometer microscope 10 continuously monitoring the temperature of a target area on a continuously moving band-saw blade 11 that is being heat-treated by heating means such as a gas flame 12 and quenching means 12'. The feed means for advancing blade 11 is shown as comprising rolls 13 continuously driven by a motor 14. A rate control 15 is provided for the motor, and a valve 16 and control means 17 therefor determine heat applied to the moving blade 11. The heat-responsive means within pyrometer 10 may be a suitable cell 18, responsive to infrared radiation and having an effective area that is focused on a localized target area 19 on the saw 11, by optical apparatus including an infrared-transmitting lens 20 and a mirror 21; arsenic-trisulfide glass may be used for the lens 20. The cell 18 may comprise a flake-type thermistor bolometer, and the lens 20 may be of arsenic-trisulfide or other suitable infra-red-transmitting material.

In the quality heat-treatment of band-saw blades, it is of extreme importance to continuously maintain a given temperature at a localized area at the root of the saw teeth, i.e. at a specified "microscopic" area spaced a certain limited extent from the adjacent lateral limit of the strip which constitutes the blade.

In accordance with a feature of the invention, I provide improved means whereby the pyrometer microscope 10 can be sighted at exactly the desired "microscopic" area on the target 11. The specific means for accomplishing this comprises a visual-light source 22 visible through a mask 23, the mask opening being of such size that when in focus at 19 it completely registers with the area viewed by the bolometer cell 18. In the form shown, coaxial alignment of the visual projection (of mask 23) with the infrared response of cell 18 is achieved through a concentric employment of two lens elements, the central element being the infrared-transmitting lens 20 already referred to, and the outer element being a ring-shaped lens 24 of visual light-transmitting glass. The lens elements 20—24 may be cemented into a unitary assembly, and both are preferably ground to the same focal length, it being noted that since the indices of refraction of the infrared-transmitting glass 20 and of the visual-light-transmitting glass 24 are different, the radii of curvature for the respective elements 20—24 will of course be different, all as described in greater detail in my copending application Serial No. 639,708, filed February 12, 1957, now Patent No. 2,978,956.

The optical apparatus for focusing light passing through the mask 23 at 19 further includes a mirror 25 having a central opening so that the infrared rays passing through the central element 20 may converge on mirror 21 and cell 18. The annular surface of mirror 25 need only be sufficient to accommodate the annular ray bundle which converges from the outer lens element 24 to the mask 23, as will be understood.

In order to provide a reference or basis for evaluation of the response of cell 18 to radiation detected at the target area 19, I provide in the microscope 10 a reference source 30 which may be an electrically heated element that will glow slightly or at least will radiate at a temperature in the range of that to be monitored at 19. A rheostat 31 is shown provided with adjustable means whereby the temperature of the reference source 30 may be selected; a meter 32 suggests means for monitoring the reference setting, as evaluated by a thermocouple 32' carried by the reference source 30. A visual-sighting port 33 provides means whereby the operator of the device may from time to time inspect the source 30 in order to establish that the reference is operating. Since the reference temperature at 30 is preferably adjusted to the desired target temperature, the source 30 will appear dull red when observed through port 33; exact coincidence of target and reference temperatures is achieved when the object and image distances for lens element 20 are in the preferred ratio of 1:1.

In the form shown, means are provided whereby the cell 18 is periodically and alternately exposed to radiation from the target 19 and to radiation from the reference source 30. For this purpose, a chopper blade or mask 34 is continuously rotated by motor means 35. The blade 34 is a disc having two concentric sets of openings in angularly staggered relation whereby, in a first instant, the unknown 19 is viewed on the axis 36 and, in the next instant, the known or reference radiation is viewed on the axis 37. Mirrors 38—39 and an infrared-transmitting lens 40 serve to focus the reference source 30 on the cell 18 by way of the axis 37, as will be understood; lenses 20—40 are preferably of the same focal length.

Referring more particularly to FIGS. 2 and 3, the electrical-signal output of the bolometer 18 is shown supplied first to a preamplifier 41 and then to a phase detector 42 or synchronous commutator means (diode switch) operating synchronously with the chopping means 34. Detector 42 functions from square-wave control signals developed by a photocell 58 responding to light from a source 57, as interrupted by, say, the outer series of chopper openings. Source 57 and cell 58 are shown spaced by means 55 forming part of a bracket 56 that is angularly adjustable about the chopper axis, for phase-adjustment purposes. The output of the detector 42 is then fed to suitable amplifier and filtering means 44 so as to achieve a relatively steady signal, and the resultant signal is monitored at a directionally-responsive D.-C. voltmeter calibrated as a deviation meter 45. This signal will be of zero amplitude as long as the reference and unknown temperatures coincide; for deviations of one sense, the output signal will be of one polarity, and for deviations of opposite sense, the output signal will be of opposite polarity.

In operation, the meter 32 will have been calibrated so as to read directly in terms of the temperature at which it is desired to observe the target area 19, and the chopper 34 will be run continuously at a speed establishing a desired chopping rate, such as 90 cycles per second. The phase detector or synchronous commutator serves the function of establishing a reference for identification of the phase relation between alternate signals reaching cell 18. If the target temperature 19 exactly matches that of the reference source 30, then both the alternating signals (on axes 36—37) reaching the cell 18 will be of the same amplitude, and a steady output signal of zero amplitude will be delivered to the D.-C. voltmeter 45, which in such case would read zero degrees deviation. If, on the other hand, the target temperature at 19 should exceed that of the reference 30, the detector will effectively polarize the output signal delivered to the deviation meter 45, so that a reading of so many degrees positive deviation may be obtained. On the other hand, if the temperature observed at 19 is less than that of the unknown 30, a negative deviation will be observed at 45.

In accordance with a further feature of the invention, the described pyrometer microscope may be incorporated into an automatic heat-treatment system for the continuous bandsaw blade 11. Corrective controls are operated at 15—17 in accordance with the polarity and amplitude of the deviation signal present in line 46. In the particular arrangement shown, heat control within a certain range and for a given speed of the feed motor 14 is achieved solely through the means 17 operating on the gas-supply valve 16, thus determining the intensity of the flame 12. If corrections are called for beyond the ability of the control 16—17 to handle them, a suitable control-limit responsive means 47 may become operative to shift the range of operation, as by shifting the speed of the motor 14. The mechanism for achieving this may involve an electrical interconnection between the means 47 and the means 15, but in the form shown, a mechanical interconnection is indicated at 48, suggesting, for example, a solenoid-operated mechanical shift of the speed controller 15. Thus, as long as the temperature observed at 19 is held within the limits of heat control possible by adjustment of means 16—17, the motor 14 will be driven at substantially constant speed, and reliance will be placed solely on the heat-control means 16—17 to achieve constant temperature at the target area 19. Only when such control fails to achieve constant temperature at 19 will the control-limit responsive means be effective to change motor speed in order effectively to extend the range of heat control available.

It will be seen that I have described a means whereby a continuously moving target (heat source) may be monitored on a very localized "microscopic" area and whereby it may be known for certain just what the exact monitored area is. In a specific embodiment of my invention, the area viewed by the bolometer 18 at the target area 19 is 0.01 in. by 0.2 in., the long dimension of the area being oriented transverse to the movement of the saw blade 11. For precise positioning of this target or viewed area 19 on the blade 11 relative to the upper and lower limits of the blade 11, I show an elevating mechanism 50 carried by a suitable frame 51 and having a bracket 52 to which the microscope 10 is mounted.

In the preferred arrangement in which the lens (20)-to-object (19) distance equals the lens (20)-to-image (18) distance, there is a 1:1 relation between the target (19) temperature and the reference (30) temperature. This enables an operator with a practiced eye to confirm through port 33 that the desired temperature level is being monitored; alternatively, the operator may satisfy himself with more quantitative confirmation, using a conventional optical pyrometer to observe color temperature of the reference, through port 33. In the latter event, the relatively large area of source 30 (compared with the "microscopic" observed target area) means that my pyrometer microscope is able to develop an enlarged (equivalent heat) "image" of the observed target area, uncorrupted by need for temperature correction, and unaffected by any transient corrective voltages that may develop at phase detector 42.

While I have described the invention in detail for the preferred form shown, it will be understood that modifications can be made within the scope of the invention as defined in the claims which follow.

I claim:

1. In combination, two infrared-transmitting lens elements of equal focal length and having axes converging to a common image point, infrared-responsive means at said common image point, the object and image distances of said lenses being equal, a source of known radiations at the object point for one lens and a source of unknown radiations at the object point for the other lens, means to expose said lenses alternately to said infrared-responsive means, means to measure the temperature of said source of known radiations, and a visual light projection system of focal length equal to those of said lenses and including a light source of effective area substantially equal to the effective area of said infrared-responsive means to forcus said light source in register with said infrared-responsive means as viewed at said source of unknown radiations, said light-projection system being coaxial with said other lens for at least that part thereof which extends to said source of unknown radiations.

2. In combination, infrared-responsive means, a source of known infrared radiations and a source of unknown infrared radiations, optical means imaging both said sources on said infrared-responsive means at 1x magnification and including means alternately exposing said sources to said infrared-responsive means, means to measure the temperature of said source of known radiations, and a visual-light projection system of focal length equal to that of said optical means and including a light source of effective area substantially equal to the effective area of said infrared-responsive means and imaging said light source in register said infrared-responsive means as viewed at said source of unknown radiations, said light-projection system being coaxial with said optics for at least that part thereof which extends to said source of unknown radiations.

3. An infrared pyrometer comprising a heat responsive cell having a predetermined heat responsive area, said heat responsive area having a predetermined geometrical shape, a heat-transmitting lens adapted to focus heat radiations from a predetermined target plane onto said heat responsive area of said heat responsive cell, the projection of said heat responsive area onto said target plane defining a predetermined target area in said target plane, a visual light source having a predetermined light radiation area, said light radiation area being similar in geometrical shape to said heat responsive area, a light-transmitting lens adapted to direct light from said light source onto said target plane, and the optical axis of said light-transmitting lens and the focal length thereof being selected such that the area illuminated thereby in said target plane coincides with said target area therein, the radiation axis of said heat-transmitting lens coinciding with the optical axis of said light-transmitting lens, and the heat focal length of said heat-transmitting lens being equal to the focal length of said light-transmitting lens.

4. In a pyrometer construction of the character indicated, two concentric lens elements, one of said elements being made of infrared transmitting material and the other being made of light transmitting material, the radiation axis of said infrared transmitting element being aligned with the optical axis of said light transmitting element, the infrared focal length of said infrared transmitting material being equal to the optical focal length of said light transmitting element, a source of visible light, means for directing light from said source through said light transmitting element onto the focal plane of said concentric lens elements, a heat responsive cell, and means for directing infrared radiation received by said infrared transmitting element to said heat responsive cell.

5. The combination defined in claim 4 and also including a reference source of infrared radiation, means for directing infrared radiation from said source onto said heat responsive cell, an infrared chopper structure interposed between said heat responsive cell and said reference source and said infrared transmitting element, said infrared chopper structure being operable to alternately expose said cell to radiation from said reference source and to radiation received by said infrared transmitting element, and signal processing means coupled to said heat responsive cell, said signal processing means containing a synchronous commutator synchronized with the operation of said chopper structure, and said signal processing means being operable to produce an output signal indicating the difference of radiation intensity between said reference source and the radiation received by said infrared transmitting element.

6. In a pyrometer of the character indicated, a heat-detector element, a reference source of infrared radiations, a source of infrared radiations whose intensity is to be measured, means for directing radiations from said two sources to said heat-detector element along different axes, chopper means alternately exposing said heat-detector to radiation on said separate axes, and signal processing means coupled to said heat-detector element, said signal processing means including a photoelectric cell alternately exposed to a light source through a part of said chopper means, and said signal processing means being operable to produce an output signal indicating the difference of radiation intensity between said two infrared radiation sources.

7. A pyrometer as defined in claim 6, in which said chopper means comprises a continuously rotated member having a plurality of angularly spaced openings aligned with said axes.

8. A pyrometer as defined in claim 7 in which said light source and said photocell are aligned with said spaced openings along a third axis which is spaced from said first mentioned axes.

9. A pyrometer as defined in claim 7 in which said light source and said photocell are angularly adjustably mounted with respect to the rotary axis at said rotated member.

References Cited in the file of this patent

UNITED STATES PATENTS

| | | |
|---|---|---|
| 1,474,903 | Hase | Nov. 20, 1923 |
| 1,901,192 | Rheinhardt et al. | Mar. 14, 1933 |
| 1,943,521 | Ewald | Jan. 16, 1934 |
| 2,166,824 | Runaldue | July 18, 1939 |
| 2,282,045 | Fleischer | May 5, 1942 |
| 2,611,541 | Gray | Sept. 23, 1952 |
| 2,710,559 | Heitmuller et al. | June 14, 1955 |
| 2,761,072 | Wormser | Aug. 28, 1956 |
| 2,785,860 | Harrison et al. | Mar. 19, 1957 |
| 2,872,173 | Munker | Feb. 3, 1959 |
| 2,877,555 | Viscokis | Mar. 17, 1959 |
| 2,886,970 | Munker | May 19, 1959 |

FOREIGN PATENTS

| | | |
|---|---|---|
| 158,827 | Australia | Aug. 17, 1954 |